(12) United States Patent
Webster et al.

(10) Patent No.: US 8,656,293 B1
(45) Date of Patent: Feb. 18, 2014

(54) CONFIGURING MOBILE DEVICES

(75) Inventors: Roger R. Webster, San Martin, CA (US); David Tristram, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1127 days.

(21) Appl. No.: 12/181,746

(22) Filed: Jul. 29, 2008

(51) Int. Cl.
*G06F 3/048* (2013.01)

(52) U.S. Cl.
USPC ............................ 715/769; 715/735; 715/749

(58) Field of Classification Search
USPC .......... 715/769, 735, 737, 738, 740, 741, 749
See application file for complete search history.

(56) References Cited

U.S. PATENT DOCUMENTS

| | | |
|---|---|---|
| 4,752,893 A | 6/1988 | Guttag et al. |
| 5,168,441 A | 12/1992 | Onarheim et al. |
| 5,289,574 A | 2/1994 | Sawyer |
| 5,297,250 A | 3/1994 | Leroy et al. |
| 5,357,603 A | 10/1994 | Parker |
| 5,388,201 A | 2/1995 | Hourvitz et al. |
| 5,481,665 A | 1/1996 | Okada et al. |
| 5,490,246 A | 2/1996 | Brotsky et al. |
| 5,522,022 A | 5/1996 | Rao et al. |
| 5,537,630 A | 7/1996 | Berry et al. |
| 5,564,022 A | 10/1996 | Debnath et al. |
| 5,588,098 A | 12/1996 | Chen et al. |
| 5,602,997 A | 2/1997 | Carpenter et al. |
| 5,638,501 A | 6/1997 | Gough et al. |
| 5,651,107 A | 7/1997 | Frank et al. |
| 5,731,819 A | 3/1998 | Gagne et al. |
| 5,742,285 A | 4/1998 | Ueda |
| 5,764,229 A | 6/1998 | Bennett |
| 5,764,238 A | 6/1998 | Lum et al. |
| 5,765,156 A | 6/1998 | Guzak et al. |
| 5,793,376 A | 8/1998 | Tanaka et al. |
| 5,796,402 A | 8/1998 | Ellison-Taylor |
| 5,801,700 A * | 9/1998 | Ferguson ...................... 715/748 |
| 5,801,703 A | 9/1998 | Bowden et al. |
| 5,809,230 A | 9/1998 | Pereira |
| 5,835,692 A | 11/1998 | Cragun et al. |
| 5,835,693 A | 11/1998 | Lynch et al. |
| 5,838,316 A | 11/1998 | Arruza |
| 5,877,741 A | 3/1999 | Chee et al. |
| 5,877,762 A | 3/1999 | Young |

(Continued)

FOREIGN PATENT DOCUMENTS

| | | |
|---|---|---|
| EP | 548586 | 6/1993 |
| EP | 0694879 | 1/1996 |

(Continued)

OTHER PUBLICATIONS

Daniel et al., "Mashing Up Context-Aware Web Applications: A Component-Based Development Approach," WEB Information Systems Engineering—Wise 2008; Lecture Notes in Computer Science, vol. 5175, 2008, pp. 250-263, XP019103131.

(Continued)

*Primary Examiner* — Weilun Lo
*Assistant Examiner* — Rashedul Hassan
(74) *Attorney, Agent, or Firm* — Schwegman Lundberg & Woessner, P.A.

(57) ABSTRACT

Methods, systems, and apparatus, including computer program products, for configuring mobile devices using emulations of the mobile devices.

36 Claims, 9 Drawing Sheets

(56) References Cited

U.S. PATENT DOCUMENTS

| | | | |
|---|---|---|---|
| 5,883,639 A | 3/1999 | Walton et al. | |
| 5,913,063 A | 6/1999 | McGurrin et al. | |
| 5,920,659 A | 7/1999 | Iverson et al. | |
| 5,933,148 A | 8/1999 | Oka et al. | |
| 5,949,409 A | 9/1999 | Tanaka et al. | |
| 5,978,579 A | 11/1999 | Buxton et al. | |
| 6,005,568 A | 12/1999 | Simonoff et al. | |
| 6,006,231 A | 12/1999 | Popa | |
| 6,011,562 A | 1/2000 | Gagne et al. | |
| 6,031,937 A | 2/2000 | Graffagnino | |
| 6,045,446 A | 4/2000 | Ohshima | |
| 6,075,543 A | 6/2000 | Akeley | |
| 6,128,010 A | 10/2000 | Baxter et al. | |
| 6,144,381 A | 11/2000 | Lection et al. | |
| 6,154,601 A | 11/2000 | Yaegashi et al. | |
| 6,166,748 A | 12/2000 | Van Hook et al. | |
| 6,191,797 B1 | 2/2001 | Politis | |
| 6,191,807 B1 * | 2/2001 | Hamada et al. | 348/14.07 |
| 6,195,664 B1 | 2/2001 | Tolfa | |
| 6,211,890 B1 | 4/2001 | Ohba | |
| 6,246,418 B1 | 6/2001 | Oka | |
| 6,266,053 B1 | 7/2001 | French et al. | |
| 6,266,430 B1 | 7/2001 | Rhoads | |
| 6,272,484 B1 | 8/2001 | Martin et al. | |
| 6,272,558 B1 | 8/2001 | Hui et al. | |
| 6,278,448 B1 | 8/2001 | Brown et al. | |
| 6,304,684 B1 | 10/2001 | Niczyporuk et al. | |
| 6,307,574 B1 | 10/2001 | Ashe et al. | |
| 6,310,621 B1 | 10/2001 | Gagne et al. | |
| 6,321,314 B1 | 11/2001 | Van Dyke | |
| 6,353,437 B1 | 3/2002 | Gagne | |
| 6,356,903 B1 | 3/2002 | Baxter et al. | |
| 6,369,823 B2 | 4/2002 | Ohba | |
| 6,369,830 B1 | 4/2002 | Brunner et al. | |
| 6,411,301 B1 | 6/2002 | Parikh et al. | |
| 6,412,021 B1 | 6/2002 | Nguyen et al. | |
| 6,421,058 B2 | 7/2002 | Parikh et al. | |
| 6,424,348 B2 | 7/2002 | Parikh et al. | |
| 6,427,230 B1 | 7/2002 | Goiffon et al. | |
| 6,452,600 B1 | 9/2002 | Parikh et al. | |
| 6,456,290 B2 | 9/2002 | Parikh et al. | |
| 6,457,034 B1 | 9/2002 | Morein | |
| 6,466,218 B2 | 10/2002 | Parikh et al. | |
| 6,469,714 B2 | 10/2002 | Buxton et al. | |
| 6,483,524 B1 | 11/2002 | Petchenkine et al. | |
| 6,489,963 B2 | 12/2002 | Parikh et al. | |
| 6,512,522 B1 | 1/2003 | Miller et al. | |
| 6,525,736 B1 | 2/2003 | Erikawa et al. | |
| 6,526,174 B1 | 2/2003 | Graffagnino | |
| 6,542,160 B1 | 4/2003 | Abgrall | |
| 6,542,166 B1 | 4/2003 | Washington et al. | |
| 6,542,750 B2 * | 4/2003 | Hendrey et al. | 455/456.1 |
| 6,571,328 B2 | 5/2003 | Liao et al. | |
| 6,573,896 B1 | 6/2003 | Ribadeau Dumas et al. | |
| 6,577,317 B1 | 6/2003 | Duluk, Jr. et al. | |
| 6,580,430 B1 | 6/2003 | Hollis et al. | |
| 6,590,592 B1 | 7/2003 | Nason et al. | |
| 6,609,977 B1 | 8/2003 | Shimizu et al. | |
| 6,614,444 B1 | 9/2003 | Duluk, Jr. et al. | |
| 6,618,048 B1 | 9/2003 | Leather | |
| 6,636,214 B1 | 10/2003 | Leather et al. | |
| 6,639,595 B1 | 10/2003 | Drebin et al. | |
| 6,664,958 B1 | 12/2003 | Leather et al. | |
| 6,664,962 B1 | 12/2003 | Komsthoeft et al. | |
| 6,664,986 B1 | 12/2003 | Kopelman et al. | |
| 6,674,438 B1 | 1/2004 | Yamamoto et al. | |
| 6,687,745 B1 | 2/2004 | Franco et al. | |
| 6,697,074 B2 | 2/2004 | Parikh et al. | |
| 6,707,462 B1 | 3/2004 | Peercy et al. | |
| 6,714,201 B1 | 3/2004 | Grinstein et al. | |
| 6,715,053 B1 | 3/2004 | Grigor | |
| 6,717,599 B1 | 4/2004 | Olano | |
| 6,734,864 B2 | 5/2004 | Abgrall | |
| 6,765,592 B1 | 7/2004 | Pletcher et al. | |
| 6,788,318 B2 | 9/2004 | Chen | |
| 6,806,892 B1 | 10/2004 | Plow et al. | |
| 6,906,720 B2 | 6/2005 | Emberling et al. | |
| 6,910,000 B1 | 6/2005 | Yedidia et al. | |
| 6,911,984 B2 | 6/2005 | Sabella et al. | |
| 6,931,633 B1 | 8/2005 | Vazquez et al. | |
| 6,944,829 B2 | 9/2005 | Dando | |
| 6,985,939 B2 | 1/2006 | Fletcher et al. | |
| 6,993,721 B2 | 1/2006 | Rosin et al. | |
| 7,016,011 B2 | 3/2006 | De Haan | |
| 7,027,055 B2 | 4/2006 | Anderson et al. | |
| 7,047,276 B2 * | 5/2006 | Liu et al. | 709/201 |
| 7,050,955 B1 | 5/2006 | Carmel et al. | |
| 7,219,328 B2 | 5/2007 | Schloegel et al. | |
| 7,337,409 B2 | 2/2008 | Doblmayr et al. | |
| 7,367,028 B2 * | 4/2008 | Kodosky et al. | 717/177 |
| 7,415,664 B2 | 8/2008 | Aureglia et al. | |
| 7,496,888 B2 | 2/2009 | Sanjar et al. | |
| 7,533,349 B2 | 5/2009 | Saul et al. | |
| 7,577,910 B1 * | 8/2009 | Husemann et al. | 715/744 |
| 7,644,391 B2 | 1/2010 | Fisher et al. | |
| 7,716,281 B2 * | 5/2010 | Lin et al. | 709/203 |
| 2001/0030647 A1 | 10/2001 | Sowizral et al. | |
| 2001/0035885 A1 | 11/2001 | Iron et al. | |
| 2002/0065946 A1 | 5/2002 | Narayan | |
| 2002/0067418 A1 | 6/2002 | I | |
| 2002/0078453 A1 | 6/2002 | Kuo | |
| 2002/0083415 A1 | 6/2002 | Jazdzewski | |
| 2002/0087660 A1 | 7/2002 | Martin et al. | |
| 2002/0089526 A1 | 7/2002 | Buxton et al. | |
| 2002/0093516 A1 | 7/2002 | Brunner et al. | |
| 2002/0112180 A1 | 8/2002 | Land et al. | |
| 2002/0118217 A1 | 8/2002 | Fujiki | |
| 2002/0120673 A1 | 8/2002 | Tolson et al. | |
| 2002/0129092 A1 | 9/2002 | Tolson et al. | |
| 2002/0140740 A1 | 10/2002 | Chen | |
| 2002/0171682 A1 | 11/2002 | Frank et al. | |
| 2002/0174181 A1 | 11/2002 | Wei | |
| 2002/0186257 A1 | 12/2002 | Cadiz et al. | |
| 2003/0005412 A1 | 1/2003 | Eanes | |
| 2003/0008711 A1 | 1/2003 | Corbo | |
| 2003/0018708 A1 * | 1/2003 | Hlasny | 709/203 |
| 2003/0020671 A1 | 1/2003 | Santoro et al. | |
| 2003/0046316 A1 | 3/2003 | Gergic et al. | |
| 2003/0067489 A1 | 4/2003 | Wong et al. | |
| 2003/0080995 A1 | 5/2003 | Tenenbaum et al. | |
| 2003/0123739 A1 | 7/2003 | Graffagnino | |
| 2003/0132964 A1 * | 7/2003 | Santori et al. | 345/763 |
| 2003/0132967 A1 * | 7/2003 | Gangadharan | 345/769 |
| 2003/0146934 A1 | 8/2003 | Bailey et al. | |
| 2003/0158975 A1 | 8/2003 | Frank et al. | |
| 2003/0164862 A1 | 9/2003 | Cadiz et al. | |
| 2003/0169306 A1 | 9/2003 | Makipaa et al. | |
| 2003/0174136 A1 | 9/2003 | Emberling et al. | |
| 2003/0174154 A1 | 9/2003 | Yukie et al. | |
| 2003/0184595 A1 * | 10/2003 | Kodosky et al. | 345/810 |
| 2003/0189597 A1 | 10/2003 | Anderson et al. | |
| 2003/0208595 A1 * | 11/2003 | Gouge et al. | 709/225 |
| 2003/0222913 A1 * | 12/2003 | Mattila et al. | 345/764 |
| 2004/0012626 A1 | 1/2004 | Brookins | |
| 2004/0024884 A1 * | 2/2004 | Rekimoto et al. | 709/228 |
| 2004/0032409 A1 | 2/2004 | Girard | |
| 2004/0036711 A1 | 2/2004 | Anderson | |
| 2004/0039934 A1 | 2/2004 | Land et al. | |
| 2004/0056896 A1 | 3/2004 | Doblmayr et al. | |
| 2004/0179019 A1 | 9/2004 | Sabella et al. | |
| 2004/0212640 A1 | 10/2004 | Mann et al. | |
| 2004/0215740 A1 | 10/2004 | Frank et al. | |
| 2004/0223003 A1 | 11/2004 | Heirich et al. | |
| 2004/0255253 A1 | 12/2004 | Marcjan | |
| 2004/0261012 A1 | 12/2004 | Balsiger | |
| 2004/0261037 A1 | 12/2004 | Ording et al. | |
| 2004/0261038 A1 | 12/2004 | Ording et al. | |
| 2005/0010634 A1 | 1/2005 | Henderson et al. | |
| 2005/0021935 A1 | 1/2005 | Schillings et al. | |
| 2005/0022139 A1 | 1/2005 | Gettman et al. | |
| 2005/0039144 A1 | 2/2005 | Wada et al. | |
| 2005/0060655 A1 | 3/2005 | Gray et al. | |
| 2005/0060661 A1 | 3/2005 | Kawahara et al. | |
| 2005/0088447 A1 | 4/2005 | Hanggie et al. | |

(56) References Cited

U.S. PATENT DOCUMENTS

| | | | |
|---|---|---|---|
| 2005/0088452 A1 | 4/2005 | Hanggie et al. | |
| 2005/0144563 A1 | 6/2005 | Hough et al. | |
| 2005/0160368 A1 | 7/2005 | Liu et al. | |
| 2005/0168471 A1 | 8/2005 | Paquette | |
| 2005/0168476 A1 | 8/2005 | Levene et al. | |
| 2005/0193368 A1 | 9/2005 | Becker et al. | |
| 2005/0215310 A1 | 9/2005 | Boyd et al. | |
| 2005/0229190 A1 | 10/2005 | Peters et al. | |
| 2005/0240857 A1 | 10/2005 | Benedict et al. | |
| 2005/0256940 A1 | 11/2005 | Henderson et al. | |
| 2005/0278651 A1 | 12/2005 | Coe et al. | |
| 2005/0282612 A1 | 12/2005 | Mathews | |
| 2005/0283734 A1 | 12/2005 | Santoro et al. | |
| 2006/0059431 A1 | 3/2006 | Pahud | |
| 2006/0064674 A1 | 3/2006 | Olson et al. | |
| 2006/0075106 A1 | 4/2006 | Hochmuth et al. | |
| 2006/0075141 A1 | 4/2006 | Boxenhorn | |
| 2006/0089840 A1 | 4/2006 | May | |
| 2006/0123356 A1 | 6/2006 | Sobeski et al. | |
| 2006/0218499 A1 | 9/2006 | Matthews | |
| 2006/0294498 A1 | 12/2006 | Partamian | |
| 2007/0038934 A1 | 2/2007 | Fellman | |
| 2007/0044029 A1 | 2/2007 | Fisher et al. | |
| 2007/0044039 A1 | 2/2007 | Amadio et al. | |
| 2007/0061724 A1 | 3/2007 | Slothouber et al. | |
| 2007/0074126 A1 | 3/2007 | Fisher et al. | |
| 2007/0074157 A1 | 3/2007 | Worden et al. | |
| 2007/0101291 A1 | 5/2007 | Forstall et al. | |
| 2007/0157101 A1* | 7/2007 | Indiran et al. | 715/769 |
| 2007/0162589 A1* | 7/2007 | Riddle | 709/223 |
| 2007/0203984 A2 | 8/2007 | AlHusseini et al. | |
| 2007/0209013 A1 | 9/2007 | Ramsey et al. | |
| 2007/0234195 A1 | 10/2007 | Wells | |
| 2008/0155518 A1 | 6/2008 | Van Wyk et al. | |
| 2008/0201453 A1* | 8/2008 | Assenmacher | 709/219 |
| 2008/0248834 A1* | 10/2008 | Chatterjee et al. | 455/557 |
| 2009/0288012 A1* | 11/2009 | Hertel et al. | 715/738 |

FOREIGN PATENT DOCUMENTS

| | | |
|---|---|---|
| EP | 1383080 | 1/2004 |
| EP | 0972273 | 3/2004 |
| WO | WO98/45815 | 10/1998 |
| WO | WO02/09039 | 1/2002 |
| WO | WO2004/027707 | 4/2004 |

OTHER PUBLICATIONS

Grolaux et al., "Attach Me, Detach Me, Assemble Me Like You Work," Human-Computer Interaction—Interact 2005, Lecture Notes in Computer Science; LNCS Springer, Berlin DE 3585:198-212, XP019018979 (Jan. 1, 2005).

International Search Report for Application Serial No. PCT/US2008/074059, dated Jan. 23, 2009, 11 pages.

Streitz et al., "i-Land: An Interactive Landscape for Creativity and Innovation," CHI 1999 Conference Proceedings Human Factors in Computing System. Pittsburg, PA (May 15-20, 1999), pp. 120-127, XP000894211.

Adobe Systems Incorporated, "A Manager's Introduction to Adobe eXtensible Metadata Platform, The Adobe XML Metadata Framework" White Paper, 2001, downloaded from the interne at http://www.adobe.com/products/xmp/pdfs/whitepaper.pdf, 18 pages.

Adobe Systems Incorporated, "Adobe GoLive, Version 6.0, Overview" downloaded from the internet at http://www.adobe.com/golive, 2002, 4 pages.

Adobe Systems Incorporated, "Embedding XMP Metadata in Application Files (Draft)," Sep. 14, 2001, downloaded from the internet at http://xml.coverpages.org/XMP-Embedding.pdf, 16 pages.

Adobe Systems Incorporated, "Extensible Metadata Platform (XMP)," downloaded from the internet at http://www.adobe.com/products/xmp/main.html on Apr. 12, 2003, 2 pages.

Adobe Systems Incorporated, "XMP—Extensible Metadata Platform, Version 1.5," Sep. 14, 2001, downloaded from the internet at http://xml.coverpages.org/XMP-MetadataFramework.pdf, 88 pages.

Akeley, et al. "Real-Time Graphics Architecture," downloaded from the internet at http://www.gaphics.stanford.edu/courses/cs448a-01-fall, 2001, 20 pages.

Altman, R.B., "Visual Quickstart Guide Power Point 2000/98" Peachpit Press, May 7, 1999, Retrieved from the Internet at http://www.proquest.safaribooksonline.com/0201354411, 7 pages.

Apple Computer, Inc. "Writing a Desk Accessory," Developer Connection, downloaded from the internet at URL: http://developer.apple.com/documentation/mac/devices/devices-16.html on Jan. 3, 2006, 3 pages.

Beged-Dov, et al. "RDF Site Summary (RSS) 1.0", downloaded from the internet at http://web.resources.org/rss/1.0/spec on Apr. 15, 2003, 23 pages.

Cadiz, et al., "Sideshow: Providing Peripheral Awareness of Important Information," Technical Report MSR-TR-2001-83, Sep. 14, 2001, downloaded from the internet at ftp://ftp.research.microsoft.com/pub/tr/tr-2001-83.pdf, 9 pages.

Casteller, "International Search Report", European Patent Office, PCT/US2005/008805, Aug. 8, 2005, 3 pages.

Conner, et al. "Three-Dimensional Widgets" ACM Proceedings of the 1992 symposium on Interactive 3D graphics, Special Issue of Computer Graphics, vol. 26, 1992, pp. 183-188, 230-231 *8 pages).

DelChiaro, "International Search Report", European Patent Office, PCT/US2005/008804, Jul. 27, 2005, 3 pages.

Desktop Sidebar, "Desktop Sidebar Home Page", downloaded from the internet at http://webarchive.org/web/20040101160831/http://www.desktopsidebar.com/, on May 11, 2007, 5 pages.

Elliott, "Programming Graphics Processors Functionally," Proceedings of the 2004 Haskell Workshop, Sep. 22, 2004. 11 pages.

Farrand, et al. "Common Elements in Today's Graphical User Interfaces: The Good, the Bad, and the Ugly," Proceedings of the Interchi '93, Human Factors in Computing Systems, 1993, pp. 470-473.

Fried, "Developer Calls Apple's Tiger a Copycat," CNET News.com, Jun. 28, 2004, downloaded from the internet at http://zdnet.com.com/2102-1104_2-5250692.html?tag=printthis on Jul. 1, 2004, 2 pages.

Fried, "For Apple's Tiger, the Keyword is Search", CNET News.com, Jun. 28, 2004, downloaded from the internet at http://zdnet.com.com/2102-1103_2-5250346.html?tag=printthis on Jul. 1, 2004, 2 pages.

Friedman, et al. "Dashboard Blog Dec. 4, 2003", downloaded from the internet at http://www.nat.org/dashboard/blog.php3, on May 11, 2007, 31 pages.

Gellersen, et al. "WebComposition: An Object-Oriented Support System for the Web Engineering Lifecycle", Computer Networks and ISDN Systems, vol. 29, Issue 8-13 (Sep. 1997), 11 pages.

Gruber, "Dashboard vs. Konfabulator", Jun. 2004, downloaded from the internet at http://daringfireball.net/2004/06/dashboard_vs_konfabulator, on May 11, 2007, 9 pages.

Haeberli, et al., "The Accumulation Buffer: Hardware Support for High-Quality Rendering," Computer Graphics, vol. 24, No. 4, Aug. 1990, pp. 309-318.

IDEAlliance, et al. "PRISM: Publishing Requirements for Industry Standard Metadata, Version 1.2(e), First Public Draft," Sep. 4, 2002, downloaded from the internet at http://web.archive.org/web/20030406154912/prismstandard.org/spec1.2e.pdf, 95 pages.

IDEAlliance, Inc., "Information and Content Exchange, An XML Based Distribution Protocol," 2002, downloaded from the internet at http://www.icestandard.org/servlet/RetrievePage?site=ice&page=aboutice on Feb. 5, 2003, 7 pages.

Interwoven, Inc., "XML in a Content Infrastructure: Conducting Business on the Web, Domain Expertise Series", 2001, Interwoven, Inc., 21 pages.

Konfabulator, "Cupertino, Start your Photocopiers!," Retrieved from the interne at http://www.konfabulator.com, on Jul. 1, 2004, 1 page.

Konfabulator, "Konfabulator & Widget Basics," Retrieved from the Internet at http://www.konfabulator.com/info/basics.html, on Jul. 1, 2004, 3 pages.

Konfabulator, "Screenshots," Retrieved from the Internet at http://www.konfabulator.com/info/screenshots.html on Jul. 1, 2004, 2 pages.

Konfabulator, "What is Konfabulator?," Retrieved from the Internet at http://www.konfabulator.com/info/, on Jul. 1, 2004, 3 pages.

(56) References Cited

OTHER PUBLICATIONS

Lammers, et al., "Maya 4.5 Fundamentals: Chapter 13, Particle Systems and Dynamics", New Riders Publishing, 2002, 12 pages.

Microsoft Corporation, "Microsoft SharePoint Portal Server 2001; Architecting Web Parts for Business Applications—(prepared in conjunction with Avanade) White Paper," to be published by the USPTO, 11 pages.

Nvidia, "Teaching Cg,", downloaded from the internet at http://developer.nvidia.com/docs/io/4106/Teaching-Cg.pdf, to be published by the USPTO, 16 pages.

Puder, "Extending Desktop Applications to the Web," ACM International Conference Proceedings Series, Proceedings of the Jun. 2004 International Symposium on Information and Communication Technologies, 2004, vol. 90, pp. 8-13 (6 pages.).

Segal, et al. "The OpenGL Graphics System: A Specification (Version 1.5)," downloaded from the internet at http://www.opengl.org/documentation/specs/version1.5/glspec15.pdf, 2003, 333 pages.

Shantzis, Michael A., "A Model for Efficient and Flexible Image Computing," ACM Proceedings of the 21st annual conference on Computer graphics and interactive techniques, 1994, pp. 147-154.

Shiozawa, Hidekazu et al., "Perspective Layered Visualization of Collaborative Workspaces," Proceedings of the International ACM SIGGROUP conference on Supporting Group Work, 1999, pp. 71-75.

Snippet Software Inc. et al. "Corporate Portal Newsletter: Product Spotlight Non-Browser Based Portal Solution from Snippets Software, Inc.", vol. 1, No. 10, Oct. 2000 downloaded from the internet at http://web.archive.org/web/20010603050951/www.snippets.com/download/Corporate_Portal_Article.pdf, on Jul. 22, 2008, 3 pages.

Snippet Software Inc. et al. "Snippets Software" downloaded from the internet at http://www.snippets.com/, on Jun. 11, 2001, 16 pages.

Staples, "Representation in Virtual Space: Visual Convention in the Graphical User Interface", ACM Proceedings of the INTERACT '93 and CHI '93 Conference on Human Factors in Computing Systems, 1993, pp. 348-354 and 542 (8 pages).

Stardock Corporation "DesktopX Whitepaper and users Guide Version 2" downloaded from the internet at www.stardock.net/media/whitepaper_desktopx.html, on May 14, 2007, 72 pages.

Tang, et al., "ConNexus to Awarenex: Extending Awareness to Mobile Users," ACM Proceedings of the SIGCHI conference on Human factors in computing systems, 2001, pp. 221-228 (8 pages).

Triest, "International Search Report and Written Opinion", European Patent Office, PCT/US2005/022152, Jul. 10, 2006, 8 pages.

Ullenboom, "Java ist auch eine Insel," downloaded from the internet at http://www.galileocomputing.de/openbook/javainsel2//java_140000.htm#Xxx998138, on Apr. 13, 2006, 3 pages.

Van Gelder, et al. "Direct Volume Rendering with Shading via Three-Dimensional Textures," ACM Proceedings of the 1996 symposium on Volume visualization, 1996, 9 pages.

Vieira, "International Search Report and Written Opinion", European Patent Office, PCT/US2005/022579, 15 pages.

W3C, "Objects, Images and Applets," Feb. 10, 2003, Retrieved from the Internet at http://www.web.archive.org/web/20030210154019/http://www.w3.org/TR/REC-html140/struct/objects.html, 21 pages.

W3C, "HTML 4.01 Specification, W3C Recommendation Dec. 24, 1999", downloaded from the internet at http://www.w3.org/TR/html4/ on Apr. 16, 2003, 453 pages.

W3C, "Resource Description Framework (RDF) Model and Syntax Specification, W3C Recommendation Feb. 22, 1999", downloaded from the internet at http://www.w3.org/TR/1999/REC-rdf-syntax-19990222/ on Apr. 15, 2003, 56 pages.

W3C, The Information and Content Exchange (ICE) Protocol, w3C Note Oct. 26, 1998:, downloaded from the internet at http://www.w3.org/TR/NOTE-ice.html on Apr. 15, 2003, 129 pages.

W3C "XHTML™ 1.0 The Extensible HyperText Markup Language (Second Edition), A Reformulation of HTML 4 in XML 1.0, W3C Recommendation Jan. 16, 2000, revised Aug. 1, 2002", downloaded from the internet at http://www.w3.org/TR/xhtml1/ on Apr. 16, 2003, 26 pages.

W3C, XSL Transformations (XSLT) Version 1.0, W3C Recommendation Nov. 16, 1999, downloaded from the internet at http://www.w3.org/TR/xslt W3C Recommendation Nov. 16, 1999, 90 pages.

Wardell, "Konfabulator for Windows", downloaded from the internet at URL: http://www.xpthemes.com/forums.asp?MID=19&CMID=19&AID=4472, on Jan. 10, 2004, 6 pages.

Wikipedia "AppleScript", downloaded from the internet at http://en.wikipedia.org/wiki/AppleScript on Dec. 11, 2007, 8 pages.

Wikipedia, "Comparison of Widget Engines", downloaded from the internet at http://en.wikipedia.org/wiki/Comparison_of_widget_engines, on May 11, 2007, 6 pages.

Wikipedia, "Windows Sidebar", downloaded from the internet at http://en.wikipedia.org/wiki/Windows_Sidebar, on May 11, 2007, 2 pages.

Carciofi, Authorized Officer, "International Search Report and Written Opinion", Patent Cooperation Treaty, PCT/US2009/033114, dated May 7, 2009, 12 pages.

Lambert, International Search Report and Written Opinion dated Mar. 24, 2009 for International Application No. PCT/US2008/078496, filed Jan. 10, 2008 (30 pages).

O'Conner John, "Creating Extensible Applications with the Java Platform," Sun Java Technical Articles [Online] Sep. 2007, retrieved from the Internet: URL:http://java.sun.com/developer/technicalArticles/javase/extensible/ [retrieved on Apr. 27, 2009], 10 pages.

Adobe Systems Incorporated, Adobe GoLive Classroom in a Book: Safari Books Online, Academic, Aug. 16, 2004, downloaded from the Internet http://academics.safaribooksonline.comibookiweb-design-and-development10321278496, 3 pages.

U.S. Patent Office, U.S. Appl. No. 12/062,487, filed Apr. 3, 2008, in Office Action dated Sep. 7, 2010, 30 pages.

Fejes, Programming Konfabulator Widgets, 10x More Productive Blog (2005).

Lowery et al., Macromedia® Dreamweaver® MX 2004 Web Application Recipes: Safari Books Online, Nov. 24, 2003, published by Macromedia, 2 pages.

Miller, Michael "Google.pedia: The Ultimate Google Resource," Que, pp. 561-565 (Jul. 11, 2006), downloaded from the Internet at http://academic.safaribooksonline.com/book/web-applications-and-services/078973639x, 6 pages.

Miller, Michael, How Microsoft Windows Vista Works, Dec. 28, 2006, published by Microsoft, download from in internet at http://academic.safaribooksonline.com/book/operating-systems/0789735857, 3 pages.

Office Action, Chinese Application No. CN 101821714 A, dated May 23, 2012.

* cited by examiner

Configure Weather Watcher

Weather for [city] , [state]
or
[zip code]
Forecast ☐ None ☐ 5 Day

FIG. 1C

Configure Image Grabber

Image Resolution
▲
▬
▼
Less   More

Black and White Only ☑

[Next] [Cancel]
163

162

166

Configure OCR

Available Languages
English
Chinese
Hebrew
Arabic
Greek
◄ ○ ►
▲ ▼

Installed Languages
English

[Previous] [Done]
165

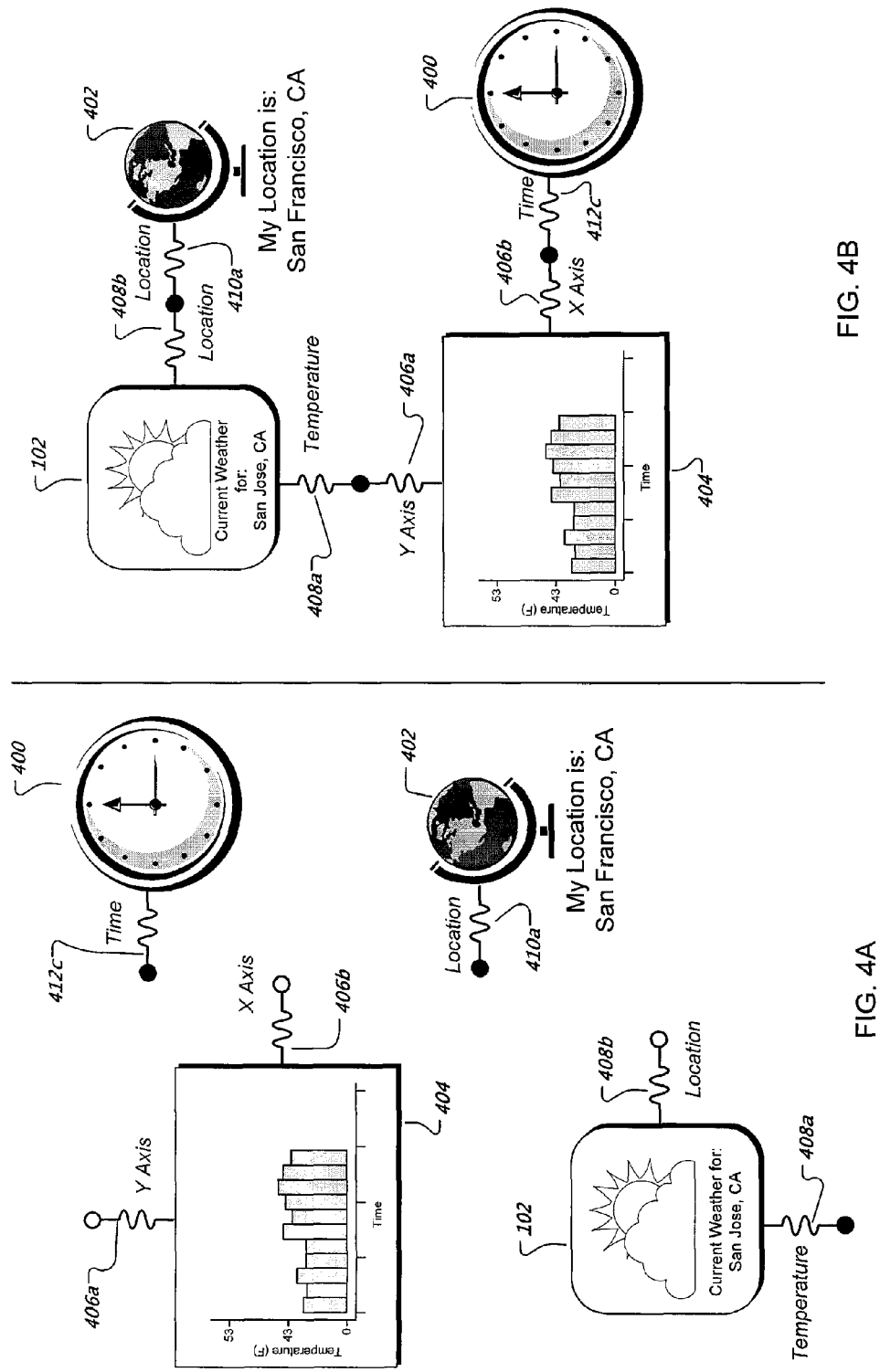

CONFIGURING MOBILE DEVICES

BACKGROUND

This specification relates to the configuration of data processing devices, and in particular to the self-service configuration of mobile devices such as mobile telephones, with functionality by users using graphical user interfaces displaying representations of the functionality and the configured devices.

SUMMARY

In general, one aspect of the subject matter described in this specification can be embodied in a method that includes receiving first user input moving a graphical representation of first functionality to a graphical representation of a physical device; in response to the moving, emulating the first functionality for the physical device and updating the graphical representation of the physical device based on the emulating; and in response to a further user input or an event, selecting a component needed to implement the first functionality on the physical device based on the physical device's capabilities and causing download of one or more components to the physical device so that the physical device acquires the first functionality. Other embodiments of this aspect include corresponding systems, apparatus, and computer program products.

These and other embodiments can optionally include one or more of the following features. Selecting can be based on a permission associated with a user of the physical device. The first input can comprise a drag and drop operation. A source for the drag and drop operation can be a running application that presents the graphical representation of the first functionality, and the target of the drag and drop operation is the graphical representation of the physical device. Second user input directed to the graphical representation of the physical device can be received and provided to the emulation. The graphical representation of the physical device can resemble the physical device. The one or more components can be one or more of: an application component, configuration information, capability information, content, a description of content, programming language statements or expressions, and executable software. The component can be connected to an existing application component within the emulation such that the component receives information from, or provides information to, the existing application component as part of the emulation. The graphical representation of the physical device can be displayed by a computing device when the physical device is detected to be in a proximity to the computing device. One or more additional components can be selected based on the selected components and cause download of the additional components to the physical device. The graphical representation of the physical device can comprise a simulated display and where updating the graphical representation comprises updating the simulated display. Second user input moving a graphical representation of second functionality from the graphical representation to a data processing apparatus can be received.

This specification describes a number of methods, systems, and programs that enable users to configure their computing devices, and in particular their mobile devices, by using graphical user interface operations, for example, drag-and-drop operations, to move representations of functionality to representations of their devices. In some implementations, emulations of devices configured with the added functionality can be run to show users visible effects of the added functionality in the appearance or operation of the devices.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIGS. 1A-D illustrate example graphical user interfaces that can be used to configure one or more aspects of functionality for physical devices.

FIG. 4A is a schematic diagram of some components in an unconnected state.

FIG. 4B is a schematic diagram of some components in a connected state.

Like reference numbers and designations in the various drawings indicate like elements.

DETAILED DESCRIPTION

Figure 1A:
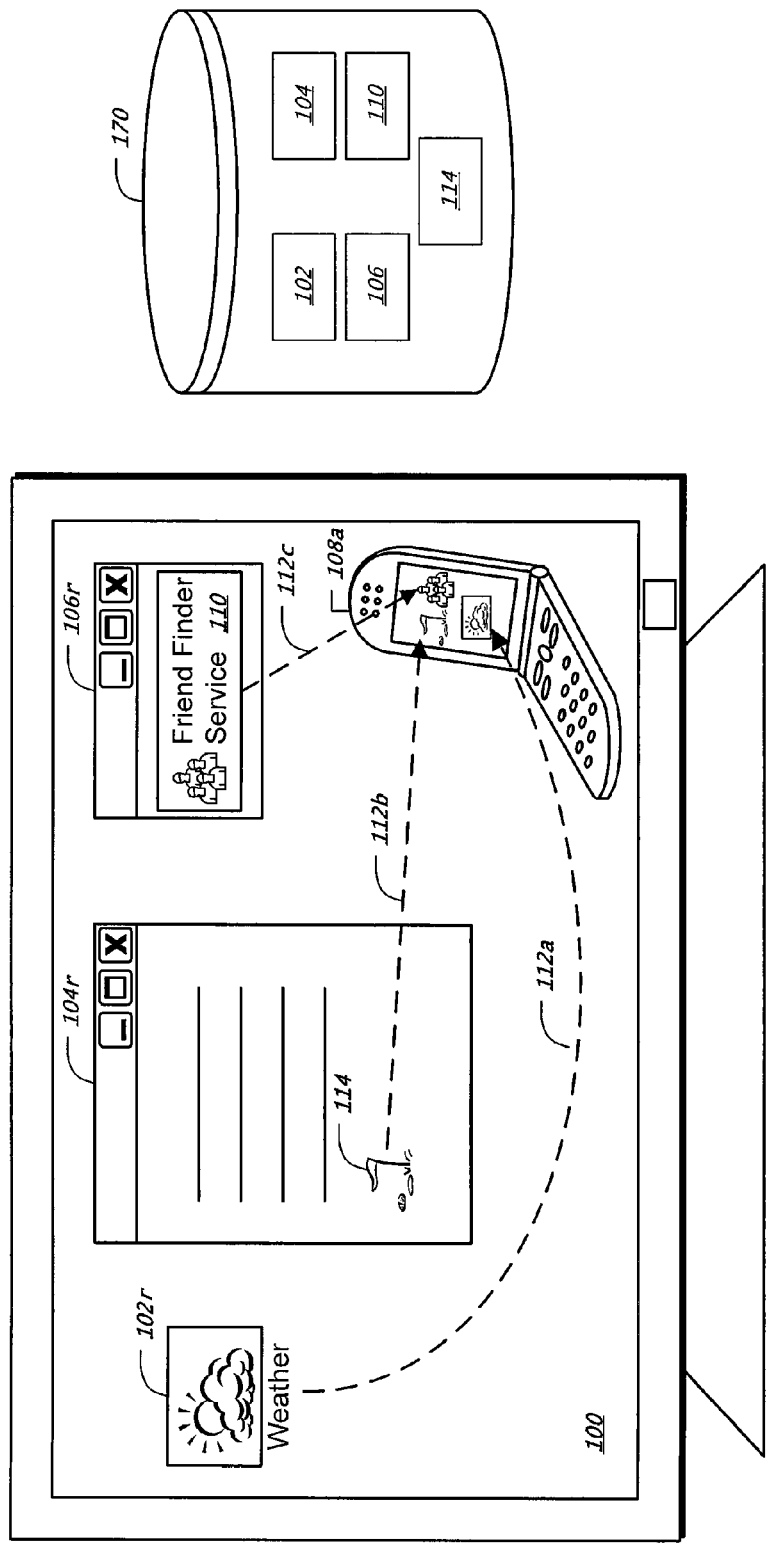
Figure 1B:
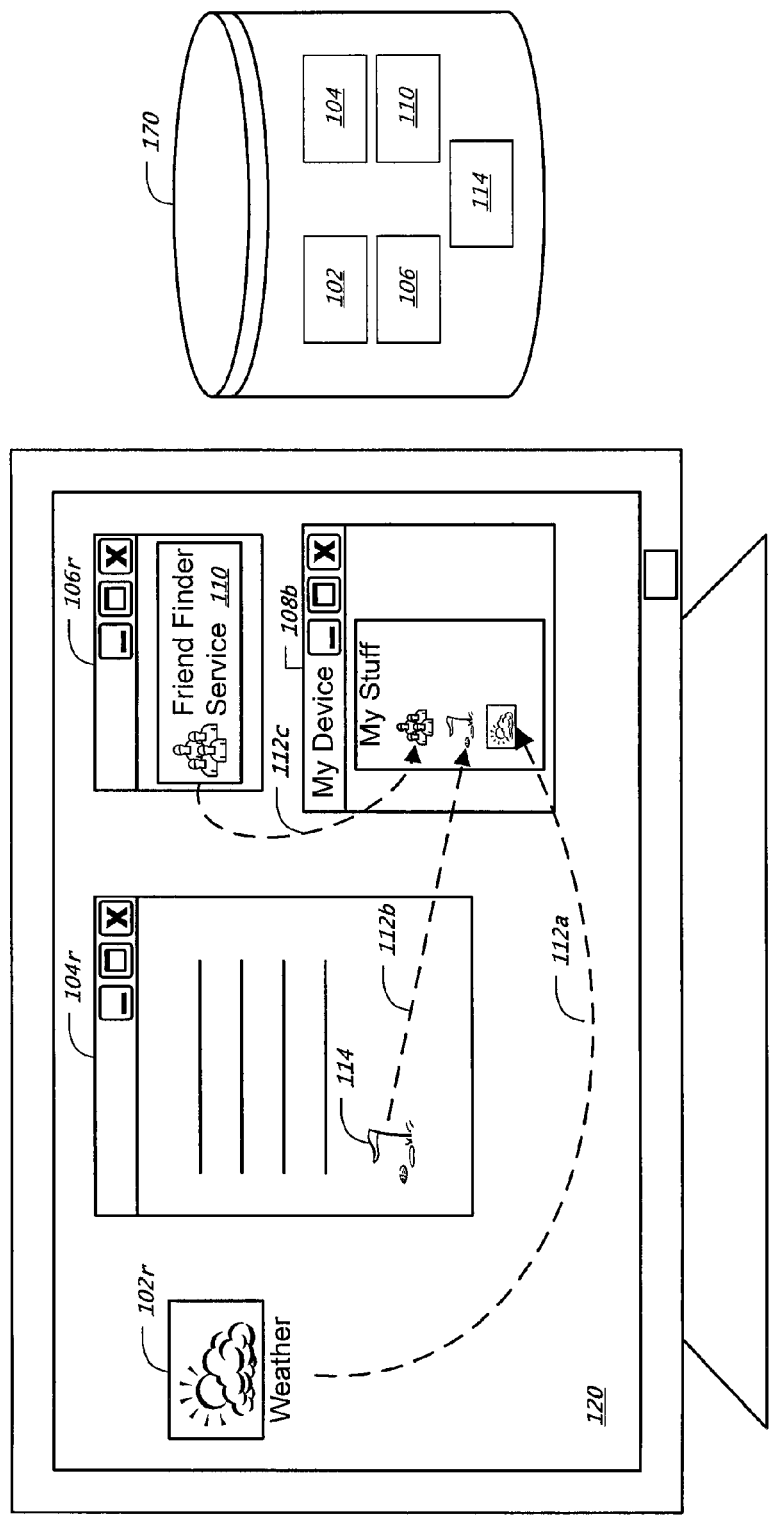

FIGS. 1A-1D illustrate example graphical user interfaces 100, 120, 140, and 160, respectively, that can be used to configure functionality for physical devices. In general, the graphical user interfaces 100, 120, 140, and 160 are generated and presented by software executing on a data processing apparatus (e.g., personal computer, portable computer, electronic game system, mobile phone, smart phone, media player, set top box, or combinations of these). An example data processing apparatus is described in more detail below, in particular in reference to data processing apparatus 210 (FIG. 2B). In the depicted examples, the user interfaces 100 and 120 include a desktop icon 102r that represents a weather component 102, a window 104r for a web browser application 104, and a window 106r for a social networking application 106. Components 102, 110, and 114 and applications 104, 106 related to the components are stored on a memory device 170 on, or accessible to, the data processing apparatus. In addition, the user interfaces 100 and 120 include a graphical representation of a physical device (e.g., a mobile device or other data processing apparatus) which is not part of the data processing apparatus. In the depicted example of FIG. 1A, the user interface 100 presents a graphical representation 108a that is similar in appearance to an actual physical device such as a smart phone. In the depicted example of FIG. 1B, the user interface 120 presents an abstract graphical representation 108b of a physical device. Other graphical representations of physical devices are possible.

In some implementations, a graphical representation is presented automatically upon determination or detection that the data processing apparatus is able to communicate with, or indirectly cause communication with, the associated physical device over one or more wired or wireless data communication networks. By way of illustration, a graphical representation (e.g., 108a or 108b) is presented when the physical device is connected to a network that is reachable by the data processing apparatus or by another system that the data processing apparatus can communicate with. By way of a further illustration, a graphical representation is presented when the physical device connects to an infrared, Bluetooth or Wi-Fi network, or a Universal Serial Bus, shared by the data processing apparatus. In other implementations, a graphical representation is presented regardless of whether the data processing apparatus is able to communicate with, or indirectly cause communication with, the associated physical device.

In various implementations, users can move functionality to the physical device in order to configure the device to suite their needs by moving (e.g., interactively in the graphical user interface) graphical or non-graphical representations of desired functionality to the graphical representation of the physical device. In some implementations, users can move functionality from a physical device to a data processing apparatus in order to configure the data processing apparatus. For example, photographs, messages and other accumulated content on the physical device can be moved to the data processing apparatus. By way of further illustration, a user might want to add a video chat functionality to a portable game system or include a three-way calling service on a mobile phone. In some implementations, the act of moving the functionality to the graphical representation of the physical device causes the download of one or more components to the physical device such that the device acquires the functionality. (Components are further discussed below.) In other implementations, downloading is not necessary to impart the desired functionality to the physical device. For example, a communication can be sent to a service provider for the physical device to request or cause the service provider to enable the functionality on the physical device. Downloading can be performed by the data processing apparatus or another system. Downloading can begin immediately or it can be deferred until an event, for example, the passage of time, the receipt of additional user input (e.g., selection of a download command), or the determination that the physical device has enough reserve power or signal strength to participate in the download process.

In further implementations, the act of moving the functionality to the graphical representation of the physical device causes emulation of the functionality on the data processing apparatus. This allows users to experience how the functionality will be implemented on the physical device. Emulation of functionality is further discussed below.

In some implementations, a user can move graphical representations of functionality between devices by way of an interactive drag-and-drop operation.

In general, the functionality is made available or visible by a so-called donor application. The functionality described by one or more components is integrated into the donor application or, alternatively, the functionality is not integrated into the donor application but the one or more components corresponding to the functionality are nonetheless identified by a visual representation or other representation in the donor application. An example of the later case is graphical file system browser which visually depicts files and directories in a computer file system. In this case, the file system graphical user interface serves as a donor application and the particular functionality is represented by a file icon in a window showing a directory's contents. If the functionality or the corresponding component(s) does not have a visual representation (e.g., a web service), the donor application can provide a default representation (e.g., a rectangle or other shape) in order to allow a user to interactively manipulate the functionality and the corresponding component(s). Another example is a graphical user interface of an operating system that displays icons representing files and other components on a desktop.

The user interfaces 100 and 120 also enable users to interactively drag particular functionality from anywhere within user interfaces 100 or 120 and drop the functionality onto the graphical representation (e.g., representations 108a or 108b) of the physical device to move or copy one or more components corresponding to the functionality to the physical device. This drag-and-drop operation is commonly found in many GUIs and is represented by the dashed lines 112a, 112b, and 112c for components 102, 114, and 110, respectively. For example, a user can select (e.g., with a mouse or other input device) the weather component 102 or functionality associated with the weather component 102 (e.g., a temperature gauge, a temperature value, or other functionality). Then, by user action, a visual representation 102r of the component 102 or associated functionality is interactively "dragged" (represented by the dashed line 112a) to the graphical representations 108a or 108b of the physical device and "dropped" at a target location within the representation. At this point, the weather component 102 or particular functionality can be integrated with the physical device, with or without further user action. Aspects of the integration are described in more detail below. Other techniques for interactively performing equivalent functionality are possible. For example, a user may use a sequence of keyboard keystrokes to copy and paste the functionality corresponding to components 102, 114, and 110 respectively, into the graphical representations 108a or 108b.

In some implementations, a user can move graphical representations of functionality between devices by way beaming information representing the functionality from one device to another by way of a wireless connection, as noted above.

In some implementations, when a particular functionality is moved or copied into the graphical representation 108a or 108b, the graphical representation 108a or 108b changes to display an emulation of the particular functionality or to display a representation that of the physical device as changed by the addition of the particular functionality. For example, in various implementations, when the user performs a drag-and-drop operation, the data processing apparatus executes one or more portions of code associated with the selected drag-and-dropped component(s) and presents a representation of the functionality in the graphical representations 108a or 108b, according to the executed code, the particular functionality, a corresponding component hierarchy, or combinations of these. Components and component hierarchies are described in more detail below.

The term "component" is used generically in this specification to describe a unit of software functionality moved, copied or otherwise integrated into a software application, and may be a subset of an application's functionality. For example, a so-called application component (e.g., the friend finder service component 110) can be integrated with the social networking application 106 to provide functionality relating to the identification of one or more friends within a social network. In general, an application component is a particular component that is associated with some functionality implemented in the executable code of an application. Application components can be moved or copied from donor applications, with are described in more detail below. As another example, other components such as address book data can be copied into the social networking application 106 to provide functionality relating to the identification one or individuals according to the address book data. In various implementations, the data may be integrated with the application 106 to provide the functionality, described in the previous example. For example, the address book data can be stored in a location and with a representation that is accessible to the social networking application 106, allowing the application to use the address book data to identify one or more individuals in the address book.

More generally, a component can be realized as data or one or more functions, methods or procedures in a programming language. In general, components include, but are not limited to, an application component, configuration information, capability information, content (e.g., an address book, spreadsheet, video, music, or other content), a description of content, programming language statements or expressions, and executable software. In some implementations, a component is realized as a reference to the location of a library of byte code containing an implementation of a class of the component being dragged, the name of the class being dragged, and names and values of properties to be set on a new instantiation of the class being dragged when the drag is complete.

In various implementations, the actual moving or copying of functionality to a physical device can be done using, for example, the communication coupling between the data processing apparatus, by way of another data processing device that can communicate with the physical device. For example, a Bluetooth dongle can be coupled with the data processing apparatus, which can communicate with the physical device. Additional examples of communication couplings are described in more detail below.

In various implementations, a component can be moved, copied, or otherwise integrated into a so-called recipient application. A recipient application displays the graphical representations 108a or 108b and may perform emulations in response to component drops. An example emulation is described in more detail below.

Functionality integration will now be discussed in more detail. Initially, the functionality to be moved or copied is identified by a user or a process. For example, the donor application 106 detects that a mouse drag begin event has occurred in a window region. In response to this event, the donor application 106 identifies the particular functionality associated with the drag begin event. In addition, the donor application 106 can collect information related to the functionality that might be needed by a physical device. Moreover, the donor application 106 may identify one or more components that implement the identified functionality. In various implementations, the donor application also collects component information that might be used to configure the component or otherwise specify how the components are used by a physical device. For example, the component information includes, or refers to, information describing the component's automatic connections as well as the location of the component's source code and/or executable code. Automatic connections are further described below. Other information can be included with the component information including, but not limited to, the location of component resources such as image files, icons, sound files, other content, digital rights management (DRIVI) information for the component, and information regarding the donor application. DRM information can specify the privileges or rights granted from the donor application to the recipient application for use of the component, for instance. These rights can include, for example, the right to execute the component (e.g., in a non-demonstration mode or a limited demonstration mode), rights governing use of the component's connections, the right to persist the component in the recipient application, and other rights. Some or all of this information can be placed on a clipboard data structure by the donor application 106 which is accessible by the recipient application.

When the mouse pointer has been moved into a region of the user interface corresponding to the graphical representation (e.g., 108a or 108b), a drag enter event is raised. On such an event, the recipient application can, for instance, examine the clipboard data structure to determine if the recipient application is a proper target for the eventual drag drop event. In some implementations, the recipient application can change its graphical representation or behavior to reflect a new mode of operation if the recipient application is a proper target for the eventual drop operation. By way of illustration, the recipient application can hide representations of functionality in its graphical representation that are not relevant to the functionality being dragged. Other ways for changing the graphical representation of the recipient application are possible.

In some implementations, after the drag enter event and during a drag move event, the graphical representation of the recipient application can be changed to indicate where a new component will appear if the drop is completed. For example, if the graphical representation includes a simulated display for the physical device, the simulated display can change to show how the component will appear if dropped onto the graphical representation. In further implementations, transient selection of existing components in the recipient application is presented in the graphical representation which, in some implementations, can be used to influence the automatic connection behavior of components.

The recipient application then detects that a drag drop event has occurred on a target location (e.g., graphical representation 108a or 108b associated with the recipient application), or on a collapsed, shrunken or minimized version of the graphical representations, or on an alternative representation of the recipient application, such as an icon or other visual object. In response, the recipient application can emulate the functionality in the physical device and may change the graphical representations 108a or 108b accordingly. For example, the graphical representations 108a or 108b can display representations of the component(s) associated with the emulated functionality. In some implementations, the recipient application may generate a sound or other feedback in addition to, or instead of, modifying the graphical representations 108a or 108b. Example emulation techniques are described in more detail below. At some later time, the functionality can be downloaded to the physical device and the physical device can incorporate the functionality (e.g., data or code associated with the identified component(s) into one or more applications) according to received further user input or other received events, examples of which are described in more detail below.

In some implementations, when a mouse is moved out of the recipient application's graphical representation, the recipient application is restored to a state that existed before the drag enter event.

In various implementations, the particular functionality (and/or the associated components) may require further configuration. For example, as illustrated in FIGS. 1C and 1D, user interfaces 140 and 160, respectively, may be provided after particular functionality has been dragged-and-dropped into the graphical representations 108a or 108b. The user interfaces 140 and 160 allow a user to specify one or more configuration parameters for a particular function, a component, a set of components, or combinations of these. In the depicted example of FIG. 1C, user interface 140 provides multiple data entry fields that allow the user to provide their location and set of check boxes that specifies if the user wants a 5-day forecast displayed with the other weather information. In example of FIG. 1D, the user has dragged-and-dropped some functionality that enables the user to identify characters in one or more documents using optical character recognition (OCR). However, in the particular example, the OCR functionality also requires that the documents be captured using the digital camera incorporated in the physical device. That is, the OCR functionality is implemented by both an OCR component and an image capture component. For example, the component hierarchy (as described in more detail below) specifies that both the OCR component and the image capture component be installed on the physical device, when the OCR functionality is installed. Thus, when the user configures the OCR component (e.g., as illustrated by user interface window 164), the user should also configure the camera component (e.g., as illustrated by user interface window 162).

One or more buttons within user interface 160 allow the user to switch between the different user interface windows (e.g., as illustrated by arrows 166) used to configure the different components. For example, if the user selects the next button 163 in the user interface window 162, the user interface 160 is updated, and user interface window 164 is presented. In addition, if the user selects the previous button 165 in the user interface window 164, user interface 160 is updated and user interface window 162 is presented. In some implementations, the presentation of the user interface windows is specified by the component hierarchy. For example, because the image capture component is lower on the component hierarchy than the OCR component, the image capture component's configuration window 162 is present first in the user interface 160. That is, because the OCR component uses functionality in the image capture component, the OCR component is higher on the component hierarchy. Component hierarchies are described in more detail below.

Once the data processing apparatus receives the further input (e.g., the user input in the form of values entered into user interfaces 140 or 160), the data processing apparatus can provide one or more components to the physical device. In various implementations, this can be determined from the component hierarchy, which is described in more detail below. For example, the OCR functionality uses both an OCR component and an image capture component, as specified by a component hierarchy. In various implementations, the further input can also be one or more events. For example, after an elapsed time, the data processing apparatus may provide one or more components to the physical device, according to the functionality moved or copied to the recipient application.

In various implementations, if the functionality or corresponding component(s) have a visual representation, as the icon 102*r* for the weather component 102 does, the visual representation is integrated into the display hierarchy of the graphical representation of the physical device such that the component is visually apparent to the user (e.g., displayed in graphical representation 108*a* or 108*b*).

Figure 1E:
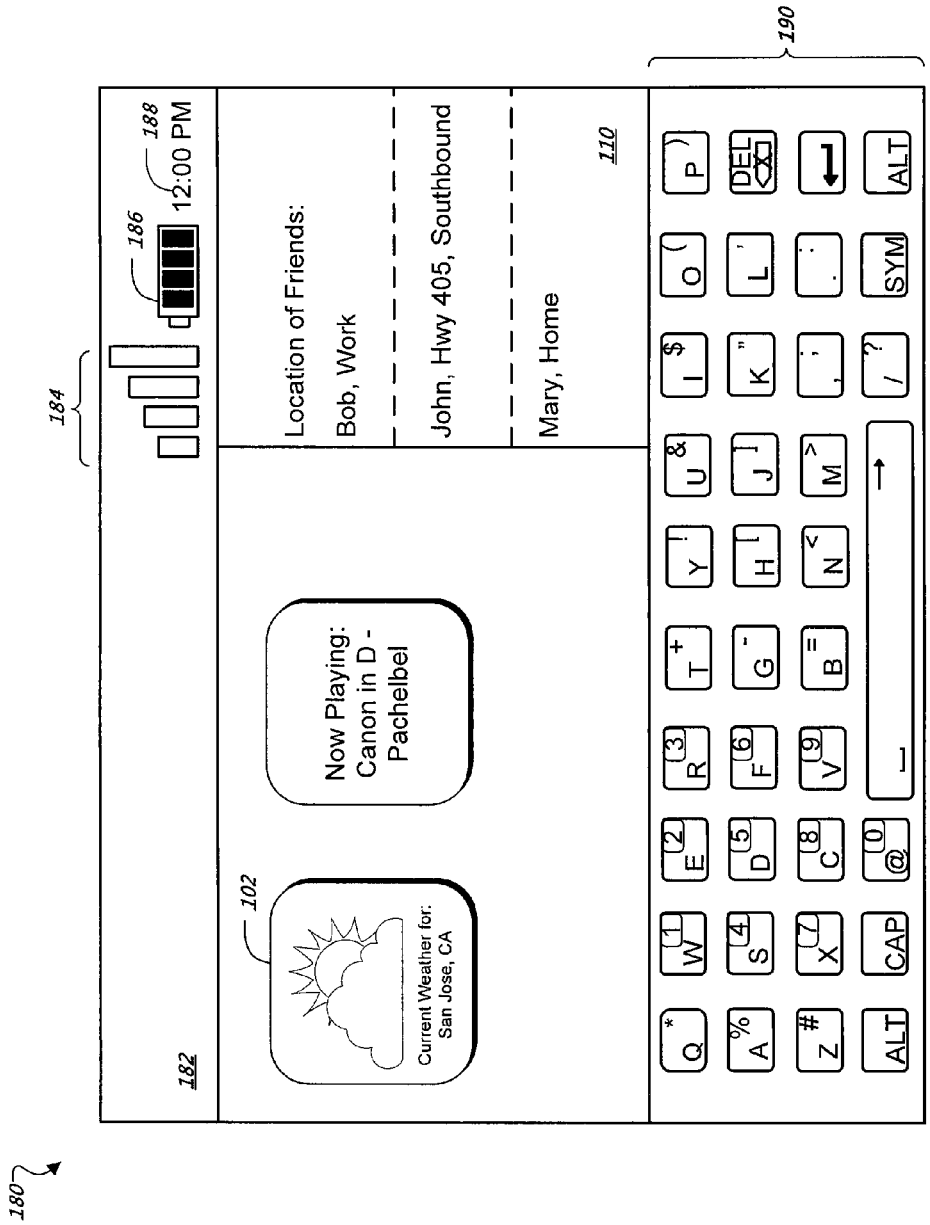
FIG. 1E is a schematic diagram showing an example emulation of one or more components.

For example, in reference to FIG. 1E, an example emulation 180 of functionality and the associated component(s) as realized in the physical device is shown. The emulation 180 can be presented within the graphical representation 108*a* or, as illustrated in FIG. 1E, as a separate presentation of input and/or output elements of the physical device. The emulation 180 can be a close up view of the graphical representation 108*a*, provided by the recipient application. In the depicted example, the physical device and its installed components are simulated, which presents the components according to the functionality that each of the components provides. For example, components 102 and 110 are emulated according the particular data or executable code associated with them. That is, the component's executable code can be invoked, or the data provided to an application can be used, and the results presented in the emulation 180.

In some implementations, if the recipient application is executed on a data processing apparatus that includes a virtual machine (VM), such as the Adobe Flash ActionScript virtual machine available from Adobe Systems Incorporated of San Jose, Calif., code designated to handle the mouse drop event in the VM can cause the data or executable code (e.g., source code) identified by the drop-target information to be loaded into the VM such that the component and its types (e.g., classes, interfaces) become part of the emulation's runtime environment. If the recipient application does not include a VM, then the mouse "drop" event handler can dynamically load the component's data or executable code by way of a dynamic link library (DLL) or similar mechanism, for example. In some implementations, an emulation may display a proxy representing the functionality by providing output the user expects to see without computing any real values or doing any real work. For example, the emulation 180 may present an image of the weather component 102 that is substantially similar to the icon 102*r* presented in the graphical user interfaces 100 and 120 without determining a location or the weather. An emulation can also implement a portion of the functionality that is dropped on the recipient application. For example, emulation 180 may implement the portion of functionality of the weather component 102 associated with displaying the location of the physical device, but might not determine the weather or provide any other functionality of component 102.

Another type of emulation includes emulating the hardware of the physical device in addition to simulating the software functionality. For example, in some implementations, the display simulates other aspects of the physical device. For example, the status region 182 is simulated showing a time 184, battery power 186, and reception strength 188. Furthermore, in some implementations, physical entities, such as a keyboard 190, or other buttons, can be simulated in the emulation 180. In addition, in various implementations, if user input is provided to the emulation 180 (e.g., by pressing the particular keys of the keyboard 190 using the mouse of the data processing apparatus) one or more aspects of one or more components can change along with their respective visual representation in the emulation 180. For example, if the user adds an additional friend using the friend finder service component 110, the friend may be added to the list and their location displayed in the emulation 180. Other techniques for emulating data, code, or combinations of these by a recipient application can also be used.

In various implementations, if the physical device supports a document object model (DOM), the component can be incorporated into a DOM hierarchy in the recipient application so that the component's visual representation will appear in the recipient application's window when the DOM is presented in the window, as it would be when the component is actually installed in the physical device. In some implementations, the component's visual representation is incorporated into the recipient application's display hierarchy such that the component appears at or near the target location.

Some components support automatic connections with other components provided to the recipient application and the physical device. For example, functionality corresponding to the weather component 102 may be integrated with functionality corresponding to friend finder service component 110 to show the weather conditions associated with a particular friend's location. Automatic connections allow users without programming skills to easily integrate functionality or components into applications. Automatic connections are described in more detail below.

Figure 2A:
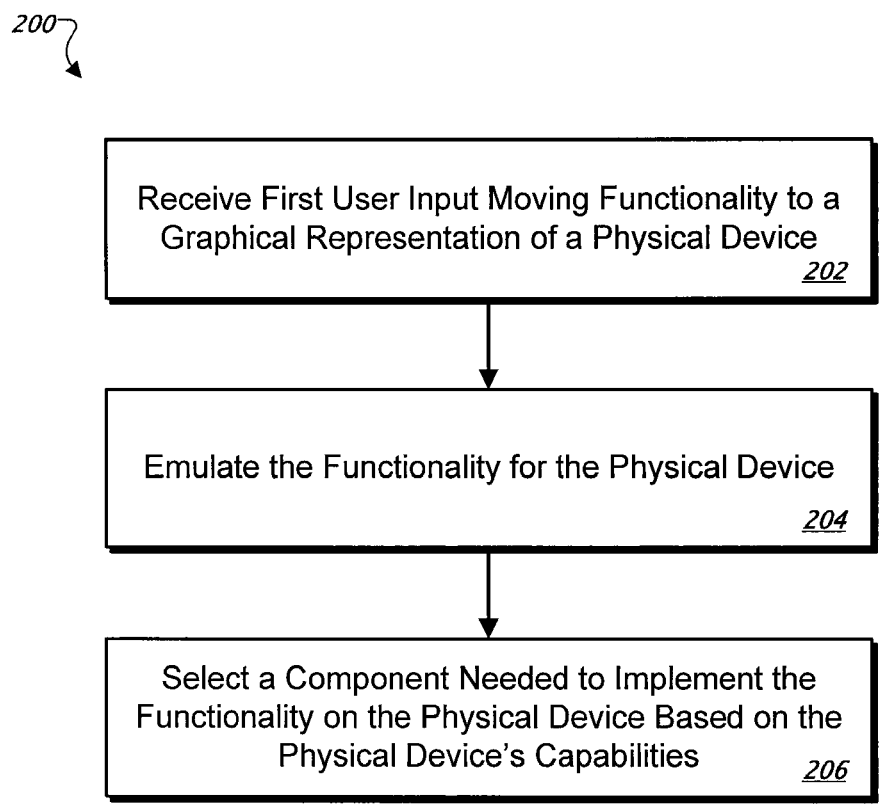
FIG. 2A is a flow chart of an example drag and drop technique.
Figure 2B:
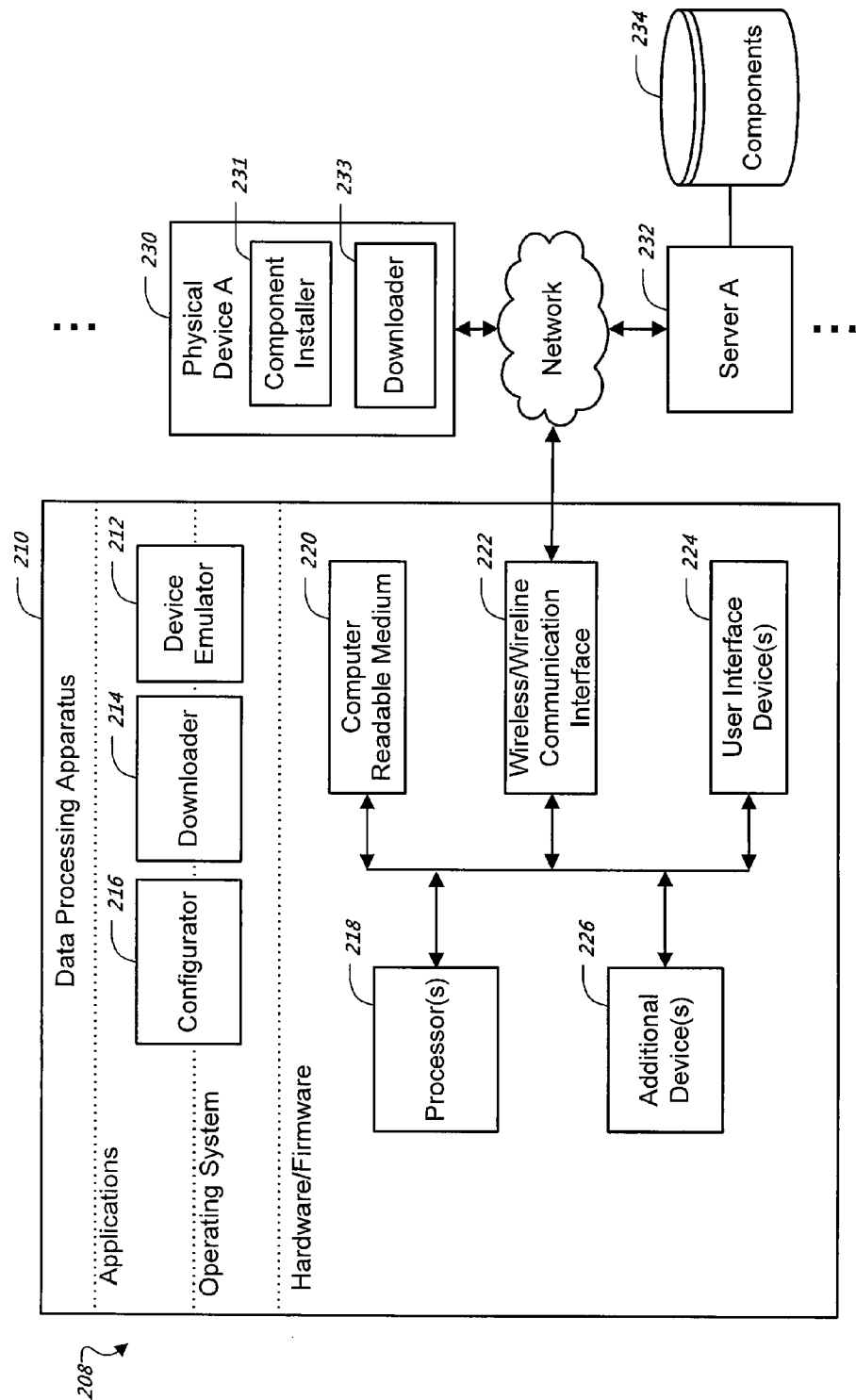
FIG. 2B is a block diagram showing an example system configured to move or copy one or more components to physical devices.

FIG. 2A is a flow chart of an example drag and drop technique 200. For convenience, technique 200 is described in reference to a system that is configured to execute the technique 200. In general, the technique 200 can be executed on a desktop computer a laptop computer, or other computing devices, such as the data processing apparatus described above and in more detail below. The technique 200 can be executed any number of times to provide a physical device with any amount of functionality corresponding to any number of components.

In step 202, the system receives a first user input moving functionality to a graphical representation of a physical device. In the depicted examples of FIGS. 1A and 1B, drag-and-drop operations illustrated by arrows 112a, 122b, and 112c can be used to move the functionality of components 102, 114, and 110, respectively, to either of the graphical representations 108a or 108b or any other recipient application that represents a physical device. In some implementations, first user input can include touch screen input, keyboard input, or any other user input that can specify the moving of functionality to a graphical representation of a physical device, e.g., by specifying navigate, copy, and paste operations.

In response to the moving, in step 204, the system emulates the functionality for the physical device. The emulation can include updating the graphical representation, generating a sound, or providing some other audible or visible feedback. For example, in reference to FIG. 1E, the system can generate an emulation 180 that updates the graphical representation to reflect the presence of the functionality that is moved. For example, because functionality corresponding to component 102 was moved, weather reporting functionality can be seen in the emulation 180.

In response to a further user input or event, in step 206, the system selects a component needed to implement the functionality on the physical device based on the physical device's capabilities. For example, a donor application can have components with different software for different target device platforms, and the system selects the appropriate component according to the actual target platform represented by the recipient application. For a further example, in reference to FIGS. 1C and 1D, in response to configuration information entered into the user interfaces 140 and 160, the system selects the components that correspond to the entered configuration information. In various implementations, the system can determine a number of components that are needed to implement the functionality according to a component hierarchy and any functionality currently implemented on the physical device (e.g., that was moved during a prior execution of technique 200) or that is known to the recipient application to be present on the physical device. In addition, after the selection, the system can cause a download of one or more components to the physical device so that the physical device acquires the functionality. For example, the system can make available executable code corresponding to the one or more components that is downloaded by the physical device.

FIG. 2B shows an example system 208 configured to move or copy one or more components to physical devices. A data processing apparatus 210 includes hardware/firmware, an operating system and one or more applications or application modules, including a device emulator 212, a downloader 214, and a configurator 216. As used within this specification, the term "application" refers to a computer program that the user perceives as a distinct computer tool used for a defined purpose. Any of the applications 212, 214, 216 can be built entirely into the operating system (OS) of the data processing apparatus 210, or any of the applications 212, 214, 216 can have different components located in different locations (e.g., one portion in the OS or kernel mode, one portion in the user mode, and one portion in a remote server), and the applications 212, 214, 216 can be built on a runtime library serving as a software platform of the apparatus 210. Moreover, an application 212, 214, 216 can be a graphical user interface application (e.g., a Web browser) that connects to one or more processors 218 (e.g., one or more Web servers) over a network 228 and provides the computer tool as a network service. In various implementations, any of the applications 212, 214, 216 can be a recipient application that can receive one or more user inputs corresponding to moved or copied functionality.

The device emulator 212 includes machine-readable instructions that, when executed, present a representation of one or more physical devices to be displayed on the data processing apparatus 210. That is, the emulator 212 can be used to simulate the execution of functionality on a variety of different physical devices. For example, in reference to FIGS. 1A and 1E, the machine-readable instructions present a simulation (e.g., represented by emulation 180) of the physical device represented by the graphical representation 108a. The device emulator 212 can include device emulators from any number of providers and can emulate the functionality of the physical device according to any number of conventional techniques.

The downloader 214 includes machine-readable instructors that, when executed, download, or make available for download, one or more components. For example, in response to further user input, the data processing apparatus 210 can provide one or more components to the downloader 214 by either communicating with the component servers (server A 232) or accessing components stored locally on the data processing apparatus 210. In various implementations, the physical device 230 can download one or more components using a downloader 233 incorporated on the physical device 230. The physical device 230 is described in more detail below.

The configurator 216 includes machine-readable instructions that, when executed, present configuration options to a user or automated process. In various implementations, the configurator 216 can analyze configuration information associated with the functionality and/or component(s) to determine what parameters, if any, should be configured prior to implementing the functionality on the physical device. For example, in reference to FIGS. 1C and 1D, the configurator 216 can present user interface 140 or 160 according to executable code or a configuration file that specifies the parameters that should be configured prior to implementing the particular functionality.

The data processing apparatus 210 includes one or more processors 218 and at least one computer-readable medium 220. The at least one computer-readable medium 220 can include a random access memory (RAM) a program memory (for example, a writable read-only memory (ROM) such as a flash ROM), a hard drive, and a removable disk drive (e.g., a floppy disk, compact disk (CD), or digital versatile disk (DVD) drive). All such computer-readable media can be suitable for storing executable or interpretable computer programs, including programs or application components embodying aspects of the subject matter described in this specification. In addition, the data processing apparatus 210 can include a hard drive controller, a video controller, and an input/output (I/O) controller coupled by a system bus. The apparatus 210 can be preprogrammed, in ROM, for example, or it can be programmed (and reprogrammed) by loading a program from another source (for example, from a floppy disk, a CD-ROM, DVD, or another computer).

The data processing apparatus 210 can also include one or more input/output (I/O) interface devices, such as a wireless and/or wireline communication interface 222, one or more user interface devices 224, and one or more additional devices 226. The data processing apparatus can communicate using the communication interface 222 over network 228 according to the type of communication implemented by the network 228. For example, the communication interface 222 can communicate using a wireless Bluetooth session, a wireline USB session, a TCP/IP session (both wireless and wireline), a wireless infra-red (IR) session, or other communication sessions using the appropriate network. That is, network 228 may be a Bluetooth network, a USB network, TCP/IP network, an IR network, or a variety of other types of networks.

The network 228 can communicate with one or more physical devices (e.g., physical device A 230) and one or more component servers (e.g., component server A 232). The physical devices can be substantially similar to the data processing apparatus 210. That is, the physical devices can include any or all of the elements described in reference to data processing apparatus 210. In some implementations, the physical devices may exclude a configurator, a device emulator, or both. The physical devices include a component installer 231. The component installer 231 can receive the executable code from the downloader 214, optionally using a device downloader 233, that instructs the physical devices to install the downloaded component(s), or portions thereof, according to one or more installation parameters and the functionality. For example, in reference to FIG. 1D, the component installer 231 may only install the languages for the OCR component specified by the configuration parameters provided in user interface 164; alternatively, the downloader 214 may only download such languages to the physical device. In addition, the component installer 231 can configure the physical devices such that the component becomes part of the run-time environment of the physical devices. For example, once the weather component 102 is downloaded and installed (using any of the techniques described in this specification), the weather component 102 may be displayed during the run-time operation of the physical device A 230. That is, even if the physical device A 230 is powered-off, when the physical device A 230 is powered-on again, the weather component 102 can be automatically invoked and presented to the user.

The component servers (e.g., component server A 232) are the source of one or more components, which are generally stored in one or more component repositories 234. In various implementations, the data processing apparatus 210 communicates with the servers over network 228 to select one or more components from any of the component repositories 234. In some implementations, the selected components may first be downloaded to the data processing apparatus 210 (e.g., using downloader 214) and configured using the configurator 216 before the system 208 causes the physical devices to download the configured components. In other implementations, the configurator 216 may communicate with the component servers to configure the selected components and then communicate with the physical devices causing the physical devices to download the configured components from the servers. The component servers can be any of a number of types of servers (e.g., blade servers, workstations, or other types of servers). The component repository 234 can be any kind of repository (e.g., a file system, a database, or other types of repositories) that can be used to store the components.

Once programmed as described in this specification, the data processing apparatus 210 is operable to provide functionality for a physical device using any of the techniques described in this specification.

Figure 2C:
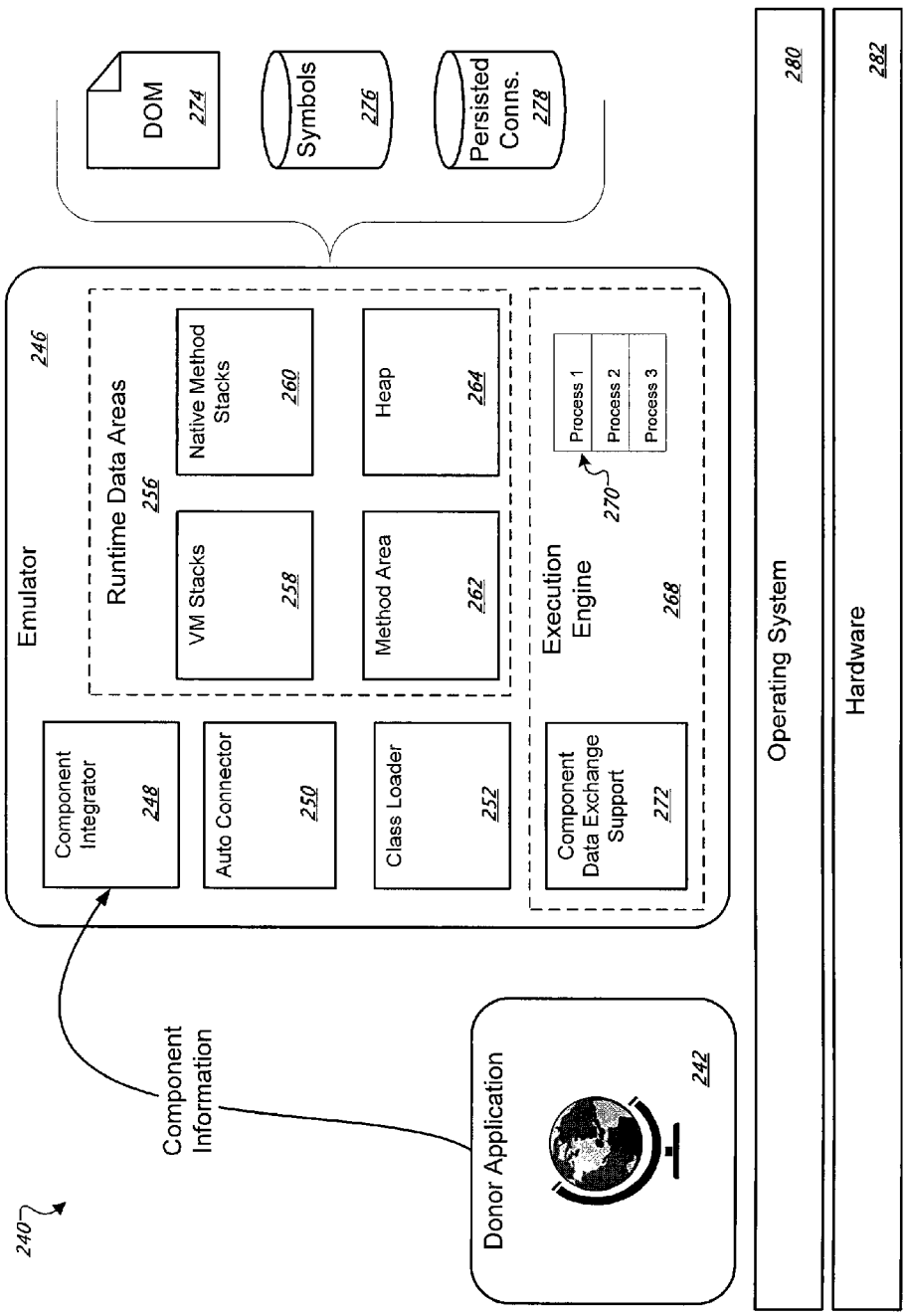
FIG. 2C is a schematic diagram showing an example automatic component connection system.

FIG. 2C is a schematic diagram of an example automatic component connection system 240. In this example, a donor application 242 and an emulator 246 are shown executing on the same data processing apparatus (e.g., apparatus 210). However, this need not be the case. In general, the donor application 242 and the emulator 246 can execute on different data processing apparatus that communicate over a computer network, for example. The donor application 242 or another process provides component information to the emulator 246 which is received by the component integrator module 248.

The emulator 246 can be implemented entirely in software or the emulator can include elements of a physical device to perform some of the operations of the physical device being emulated. In various implementations, the emulation is a complete emulation of the operation of the physical device, so that the emulator 246 can be thought of as the physical device. In such cases, any operation that can affect the emulator 246 can also affect the corresponding physical device and operations that can affect the physical device can also affect the emulator 246. Finally, in implementations where the emulator includes the actual physical device, when the donor application 242 provides component information to the emulator, the system 240 may also provide the same component information to the physical device, or when the physical device executes a process, the executing process may change the graphical representation of the emulator 246 running on the data processing apparatus.

In some implementations, the donor application 242 or any of the components contained therein may be generated using Adobe AIR™ runtime. Adobe AIR is a cross-operating system runtime that allows web developers to build and deploy web applications on the desktop. Adobe AIR is available from Adobe Systems Incorporated of San Jose, Calif. Other implementations are possible, including emulators 246 (and their corresponding physical devices) that do not include a VM.

The integrator module 248 invokes the class loader 252 to load the component's code from the location designated in the component information and populates a symbols database 276 with the symbols and associated types found in the code. The class loader 252 also recognizes metadata tags in the code and creates entries in the symbols database 276 for each connection including the connection type (e.g., sink, source), and any options placed on the connection. Code associated with the symbols is stored in the method area 262 of the runtime data area 256. The runtime data area 256 also includes stacks 258 for use by the VM and native method stacks 260 for use when invoking native methods. A heap 264 is available to methods for creating global objects. The integrator module 248 can also integrate DRM information, if any, for the component or its connections (from the component information) into the symbols database 276.

Once the code and any DRM information have been processed, the auto connector module 250 attempts to bind automatic connections on the component with components in the emulator 246 corresponding to components on the physical device. For example, see FIG. 4A and the accompanying discussion. The integrator 248 then installs the component's visual representation, if any, in the DOM 274 such that the visual representation will be presented in a rendering of the DOM 274. In some implementations, the location of the visual representation is based on the target location provided by the drag-and-drop operation (e.g., any of 112a, 112b, or 112c), if this information is included in the component information. In other implementations, the component integrator 248 can arrange the component visual representations based on their connectivity such that connected components appear closer to each other, for example. Other visual arrangements are possible.

The execution engine 268 executes code (e.g., Action-Script) from the method area 262 to create running processes 270 that can make use of the VM's resources such as the VM stacks (258) and heap (264). The executing processes 270 can utilize one or more components. Components are able to exchange information between their bound connections in a number of ways. In some implementations, the components use a synchronous messaging model implemented by a component data exchange support module 272. In this model, sink connections are registered with an event dispatcher implemented by the data exchange support module 272. When a source connection has new information to provide, the event dispatcher invokes each sink connection registered with the source connection to receive the information.

Another component interaction model is an asynchronous event model. In this model, the component data exchange support module 272 implements an event queue that source connections can post to when new data is available and sink connections can read from, asynchronously, when they are ready to receive new data. In some implementations, there is one event queue for each bound source connection. This allows for event compression since a sink connection might only desire the latest value from a source, rather than all values that have been posted since the last time the sink connection read from the queue.

A further component interaction model is a shared memory model which uses the heap 264 to store a global source connections table. Similar to the asynchronous event model, source connections can set a flag in the shared memory table when source data is ready. The component data exchange support module 272 periodically scans the table to see if new data is available on any of the connections. If so, the module 272 notifies sink connections that are bound to the source connection so that they may obtain the data.

Yet a further component interaction model is based on a data flow model. A directed graph is constructed by the component data exchange support module 272 which reflects the dependencies between sink connections and source connections. Downstream sink connections attempt to read upstream source connections and will block until the upstream source connections generate new data.

Figure 3:
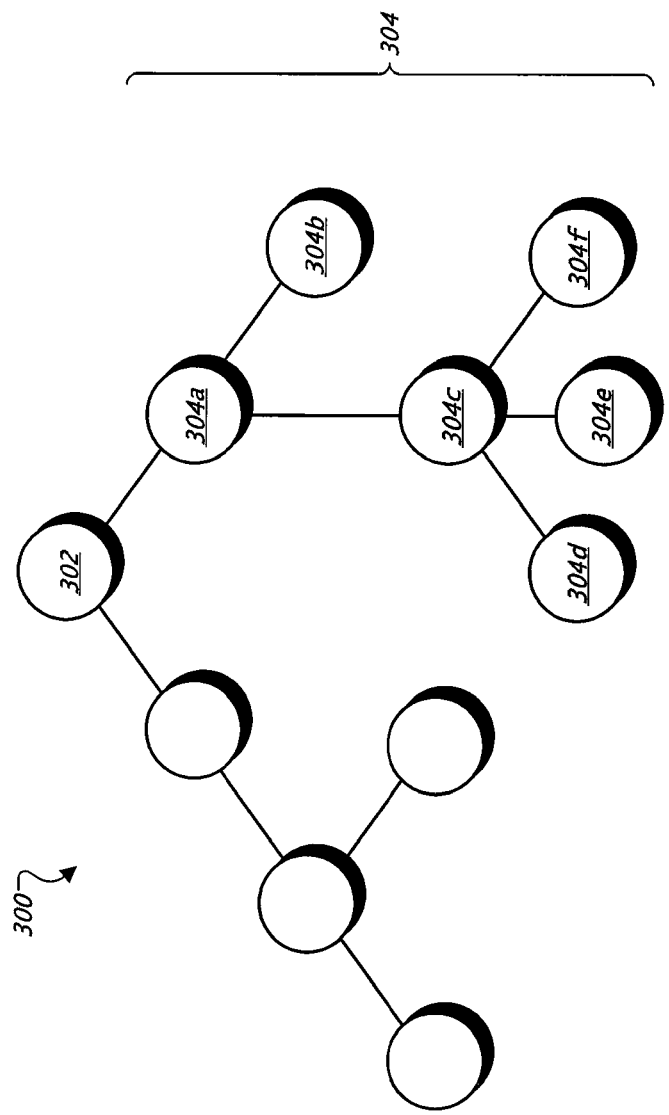
FIG. 3 is a block diagram showing an example component hierarchy.

FIG. 3 is a block diagram showing an example component hierarchy 300. A hierarchy can be used when, for example, particular functionality is implemented by a combination of components. The relationships of the components to each other can be represented as component hierarchy 300. For example, an implementation of functionality associated with component 304c also includes components 304d-304f. In general, the root component (e.g., component 302) is a so-called proxy component because in addition to the core functionality of the component 302, it is also a proxy for the other underlying components 304. That is, when a user invokes functionality corresponding to component 302, the user may also be invoking functionality corresponding to components 304 (even if the user is unaware of such an invocation). The component hierarchy 300 can specify this relationship such that when particular functionality is installed by the system 208, all of the necessary components are installed during the installation of the moved or copied functionality.

For example, consider various types of applications including visual effects software (e.g., Adobe® After Effects® software, available from Adobe Systems Incorporated of San Jose, Calif.), image editing software (e.g., Adobe Photoshop® software, available from Adobe Systems Incorporated of San Jose, Calif.), and video editing software (e.g., Adobe Premiere® software, available from Adobe Systems Incorporated of San Jose, Calif.). These applications can include very complex operations associated with particular functionality that can be implemented by any number of components. For example, red eye reduction functionality (and the corresponding component) included in the Photoshop software may be implemented by the proxy component 302 with image cropping functionality (e.g., corresponding to component 304c), color thresholding functionality (e.g., corresponding to component 304b), or other functionality (e.g., corresponding to any of the other components 304) incorporated in the functionality of the red eye reduction component. As such, when a user moves or copies the red eye reduction functionality (e.g., using techniques described above), the data processing apparatus determines which, if any, of the components 304 are installed on the physical device, configures components as appropriate, and in response to further user input or events (e.g., receiving configuration information), installs the remaining components as appropriate (e.g., using techniques described above).

The identification of the proxy component may be different according to various implementations. For example, if the user performs a drag-and-drop operation with component 304c, then component 304c may be considered the proxy component (e.g., because component 304c includes functionality incorporated in the components 304d-304f). The component hierarchy 300 can be stored on the data processing apparatus 210, on the servers (e.g., server A 232), or in other storage locations. In some implementations, the hierarchy 300 is specified in metadata associated with the particular component. For example, component 302 can include metadata that specifies that the component 302 requires functionality incorporated in component 304a. In addition, component 304a can include metadata that specifies that component 304a requires functionality incorporated in components 304b and 304c, and so on.

In various implementation, when the user moves or copies particular functionality, the system 208 can use the component hierarchy 300 to determine which components need to be configured, the order in which the configurator 216 should present the configuration interfaces to the user, or other determinations. For example, the system 208 may present a configuration user interface for component 304b before it presents a configuration user interface for component 304a or component 302, according to the relative position of the components in the hierarchy 300. In various implementations, the component hierarchy 300 can change as new components are created by users, provided by software vendors, or otherwise received.

FIG. 4A is a schematic diagram of some of the components of FIGS. 1A and 1B in an unconnected state. A component's properties can serve as sites for automatic connection with the properties of other components. Such properties, which will be referred to as "connections," act as sources or sinks. A source connection is a connection that provides information to one or more sink connections of other components. A sink connection is a connection that receives information from one or more source connections of other components. A component can have one or more source connections, sink connections, or combinations of these. As an example, if a component is a class in an object oriented programming language (e.g., ActionScript, Java or C++), methods of the class could be designated automatically or manually as source connections if they are configured to provide information, and as sink connections if they are configured to receive information, in one or more parameters.

By way of illustration, the weather component 102 has a source connection 408a for providing temperature information, and a sink connection 408b for receiving location information; the clock component 400 has a source connection 412c for providing time information; and the graph component 404 has a sink connection 406a for receiving Y values and a second sink connection 406b for receiving X values. The location component 402 has a source connection 410a for providing location information. In various implementations, connections exchange information as text strings (e.g., strings of Unicode characters), binary data, <name, value> tuples, markup language (e.g., extensible markup language (XML)), or combinations of these. Other information formats can also be used. In further implementations, the data binding features of the Adobe Flex® cross-platform application framework can be used to exchange information between connections.

FIG. 4B is schematic diagram of some of the components of FIGS. 1A and 1B automatically connected as shown in the recipient application associated with user interfaces 100 and 120 (e.g., graphical representations 108a and 108b, respectively). The location component 402 provides location information through source connection 410a to the weather component 102 by way of sink connection 408b. The weather component 102 in turn displays the weather for the received location and provides temperature information for the location on the source connection 408a. The temperature information is received by the Y axis sink connection 406a of graph component 404. The current time information provided by the clock component 400 over source connection 412c is received by the X axis sink connection 406b and used to plot temperature as a function of time in the graph component 404.

A component can comprise one or more of programming language source code, compiled or translated programming language source code, metadata, properties, and resources (e.g., images, sounds, or other content). By way of illustration, a component can be data, a method, a function, a procedure, a script, an event handler, a signal handler, or various combinations of these. Other component types are possible.

A component can participate in an automatic connection process (e.g., when a component is dropped into a recipient application) if one or more of its connections are designated as auto-connectable. In various implementations, metadata tags or other designators inline with a component's source code, or external from the source code, can indicate which connections are auto-connectable. For example, a metadata tag [AutoConnect] can be used to designate such connections. Example tag values are as follows:

[AutoConnect (source, option$_1$, . . . option$_n$)]
[AutoConnect (sink, option$_1$, . . . option$_n$)]
[AutoConnect (source, sink, option$_1$, . . . option$_n$)]

The "source" parameter indicates that a designated connection (e.g., method) can supply information to other components. The "sink" parameter indicates that the connection can accept information from other components. In some implementations, a connection can be both a source and a sink.

In further implementations, the order in which connections are made and other options can influence the automatic connection process. For example, the [AutoConnect] tag allows for one or more optional parameters, indicated as option$_1$, . . . option$_n$. An "order=n" optional parameter specifies the order "n" in which this automatically connectable connection should be considered. For example, consider the following ActionScript code:

[AutoConnect(source, order=1)]
public function get windSpeed ( ): Number {return 3; }

This code indicates that the connection called "windSpeed" should be considered before other connections for this component when connecting to other components.

Another optional parameter is "NamesMustMatch"—this restricts the type of connection between component properties to ones where the property names on the two candidates match exactly:

[AutoConnect(source, NamesMustMatch)]
public function get windSpeed ( ): Number {return 3; }

That is, for example, if one component specifies on a property named "windSpeed" that "NamesMustMatch," that property will only be bound to a property named "windSpeed" on another component.

Alternatively, two connection names match if they are synonyms. In a further alternative, the names match if they are within a specified edit distance of each other (the edit distance between two strings of characters is the number of operations required to transform one of them into the other). Other ways of matching can also be used.

Another optional parameter is "TypesMustMatch", which restricts the type of connection between component properties to ones where the property types on the two candidates match exactly or, alternatively, or are compatible (e.g., one type can be converted into the other). Consider the following example:

[AutoConnect(source, TypesMustMatch)]
public function get Temperature ( ): Number {return 78;}

In this foregoing example, if one component specifies on a property named "Temperature" that "TypesMustMatch," that property will only be bound to a sink connection on another component that accepts a numeric value (e.g., 78) rather than a string, for example.

A further optional parameter is "DRMMustMatch", which this restricts the type of connection between component properties to ones where the DRM rights on the two candidates match exactly or, alternatively, are compatible.

Yet a further optional parameter is "AllowMultiple", which means that the source or sink connection so tagged is not removed from the pool of available connections once a connection has been made.

Various implementations of the systems and techniques described in this specification can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used in this specification, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the subject matter have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method, comprising:
   receiving first user input moving a graphical representation of first functionality to a graphical representation of a physical device;
   in response to the moving, emulating the first functionality for the physical device and updating the graphical representation of the physical device based on the emulating;
   in response to a further user input or an event, selecting a component needed to implement the first functionality on the physical device based on the physical device's capabilities and causing download of one or more components to the physical device so that the physical device acquires the first functionality; and
   connecting, within the emulation, at least one of the one or more downloaded components to an existing application component associated with a second functionality previously acquired by the physical device, wherein the connected component receives information from, or provides information to, the existing application component as part of the emulation.

2. The method of claim 1 where the selecting is based on a permission associated with a user of the physical device.

3. The method of claim 1 where the first input comprises a drag and drop operation.

4. The method of claim 3 where a source for the drag and drop operation is a running application that presents the graphical representation of the first functionality, and the target of the drag and drop operation is the graphical representation of the physical device.

5. The method of claim 1, further comprising receiving second user input directed to the graphical representation of the physical device and providing the second user input to the emulation.

6. The method of claim 1 where the graphical representation of the physical device resembles the physical device.

7. The method of claim 1 where the one or more components are one or more of: an application component, configuration information, capability information, content, a description of content, programming language statements or expressions, and executable software.

8. The method of claim 1, further comprising:
   in response to the connecting, emulating the first functionality for the physical device and the second functionality for the physical device and updating the graphical representation of the physical device based on the emulating to reflect the connection.

9. The method of claim 1 where the graphical representation of the physical device is displayed by a computing device when the physical device is detected to be in a proximity to the computing device.

10. The method of claim 1, further comprising:
    selecting one or more additional components based on the selected component and causing download of the one or more additional components to the physical device; and
    connecting, within the emulation, at least one of the one or more additional downloaded components to a second existing application component associated with a third functionality previously acquired by the physical device, wherein the connected additional component receives information from, or provides information to, the second existing application component as part of the emulation.

11. The method of claim 1 where the graphical representation of the physical device comprises a simulated display and where updating the graphical representation comprises updating the simulated display.

12. The method of claim 1, further comprising:
    receiving second user input moving a graphical representation of third functionality from the graphical representation of the physical device to a graphical representation of a data processing apparatus.

13. A system comprising:
    a display device;
    a computer readable medium including a program product; and
    one or more processors configured to interact with the display device, execute the program product and perform operations comprising:
    receiving first user input moving a graphical representation of first functionality to a graphical representation of a physical device;
    in response to the moving, emulating the first functionality for the physical device and updating the graphical representation of the physical device based on the emulating;

in response to a further user input or an event, selecting a component needed to implement the first functionality on the physical device based on the physical device's capabilities and causing download of one or more components to the physical device so that the physical device acquires the first functionality; and connecting, within the emulation, at least one of the one or more downloaded components to an existing application component associated with a second functionality previously acquired by the physical device, wherein the connected component receives information from, or provides information to, the existing application component as part of the emulation.

14. The system of claim 13 where the selecting is based on a permission associated with a user of the physical device.

15. The system of claim 13 where the first input comprises a drag an drop operation.

16. The system of claim 15 where a source for the drag and drop operation is a running application that presents the graphical representation of the first functionality, and the target of the drag and drop operation is the graphical representation of the physical device.

17. The system of claim 13, further comprising operations including receiving second user input directed to the graphical representation of the physical device and providing the second user input to the emulation.

18. The system of claim 13 where the graphical representation of the physical device resembles the physical device.

19. The system of claim 13 where the one or more components are one or more of: an application component, configuration information, capability information, content, a description of content, programming language statements or expressions, and executable software.

20. The system of claim 13, further comprising operations including:
in response to the connecting, emulating the first functionality for the physical device and the second functionality for the physical device and updating the graphical representation of the physical device based on the emulating to reflect the connection.

21. The system of claim 13 where the graphical representation of the physical device is displayed by a computing device when the physical device is detected to be in a proximity to the computing device.

22. The system of claim 13, further comprising operations including:
selecting one or more additional components based on the selected component and causing download of the one or more additional components to the physical device; and
connecting, within the emulation, at least one of the one or more additional downloaded components to a second existing application component associated with a third functionality previously acquired by the physical device, wherein the connected additional component receives information from, or provides information to, the second existing application component as part of the emulation.

23. The system of claim 13 where the graphical representation of the physical device comprises a simulated display and where updating the graphical representation comprises updating the simulated display.

24. The system of claim 13, further comprising operations including:
receiving second user input moving a graphical representation of third functionality from the graphical representation of the physical device to a graphical representation of a data processing apparatus.

25. A non-transitory computer-readable medium, operable to cause data processing apparatus to perform operations comprising:
receiving first user input moving a graphical representation of first functionality to a graphical representation of a physical device;
in response to the moving, emulating the first functionality for the physical device and updating the graphical representation of the physical device based on the emulating;
in response to a further user input or an event, selecting a component needed to implement the first functionality on the physical device based on the physical device's capabilities and causing download of one or more components to the physical device so that the physical device acquires the first functionality; and
connecting, within the emulation, at least one of the one or more downloaded components to an existing application component associated with a second functionality previously acquired by the physical device, wherein the connected component receives information from, or provides information to, the existing application component as part of the emulation.

26. The computer-readable medium of claim 25 where the selecting is based on a permission associated with a user of the physical device.

27. The computer-readable medium of claim 25 where the first input comprises a drag and drop operation.

28. The computer-readable medium of claim where a source for the drag and drop operation is a running application that presents the graphical representation of the first functionality, and the target of the drag and drop operation is the graphical representation of the physical device.

29. The computer-readable medium of claim 25, further comprising operations including receiving second user input directed to the graphical representation of the physical device and providing the second user input to the emulation.

30. The computer-readable medium of claim 25 where the graphical representation of the physical device resembles the physical device.

31. The computer-readable medium of claim 25 where the one or more components are one or more of: an application component, configuration information, capability information, content, a description of content, programming language statements or expressions, and executable software.

32. The computer-readable medium of claim 25, further comprising operations including:
in response to the connecting, emulating the first functionality for the physical device and the second functionality for the physical device and updating the graphical representation of the physical device based on the emulating to reflect the connection.

33. The computer-readable medium of claim 25 where the graphical representation of the physical device is displayed by a computing device when the physical device is detected to be in a proximity to the computing device.

34. The computer-readable medium of claim 25, further comprising operations including:
selecting one or more additional components based on the selected component and causing download of the one or more additional components to the physical device; and
connecting, within the emulation, at least one of the one or more additional downloaded components to a second existing application component associated with a third functionality previously acquired by the physical device, wherein the connected additional component receives information from, or provides information to, the second existing application component as part of the emulation.

35. The computer-readable medium of claim 25 where the graphical representation of the physical device comprises a simulated display and where updating the graphical representation comprises updating the simulated display.

36. The computer-readable medium of claim 25, further comprising operations including:
  receiving second user input moving a graphical representation of third functionality from the graphical representation of the physical device to a graphical representation of a data processing apparatus.

* * * * *